[19] United States Patent
Schneider

[11] Patent Number: 4,974,412
[45] Date of Patent: Dec. 4, 1990

[54] POWER PLANT INSTALLATION

[75] Inventor: Karl-Uwe Schneider, Velbert, Fed. Rep. of Germany

[73] Assignee: RWE-Energie Aktiengesellschaft, Essen, Fed. Rep. of Germany

[21] Appl. No.: 331,678

[22] Filed: Mar. 30, 1989

Related U.S. Application Data

[63] Continuation-in-part of Ser. No. 135,137, Dec. 18, 1987, abandoned.

[30] Foreign Application Priority Data

Dec. 23, 1986 [DE] Fed. Rep. of Germany ....... 3644192

[51] Int. Cl.$^5$ .............................. F02C 3/28; F02C 6/18
[52] U.S. Cl. .................................. 60/39.12; 60/39.182
[58] Field of Search ............... 60/39.02, 39.12, 39.181, 60/39.182, 39.463, 39.465

[56] References Cited

U.S. PATENT DOCUMENTS

| 2,532,035 | 11/1950 | Pfenninger | 60/39.181 |
| 3,020,715 | 2/1962 | Thomsen | 60/39.12 |
| 3,873,845 | 3/1975 | Osthaus | 60/39.12 |
| 4,019,314 | 4/1977 | Springmann | 60/39.12 |
| 4,085,578 | 4/1978 | Kydd | 60/39.12 |
| 4,693,072 | 9/1987 | McLean et al. | 60/39.182 |

Primary Examiner—Louis J. Casaregola
Attorney, Agent, or Firm—Herbert Dubno; Andrew M. Wilford

[57] ABSTRACT

A high-output main power plant comprises a coal gasifier producing a combustible fuel gas at a large volume/time output rate, at least one gas turbine fed by the fuel gas from the coal gasifier and burning same at a volume/time rate smaller than the output rate to produce heat and mechanical energy, at least one steam turbine fed by the heat generated by the gas turbine, and an electrical generator driven by the steam turbine. A conduit conducts the continuously produced excess fuel gas from the main plant to a remote user where there is at least one satellite plant itself comprising a gas turbine fueled from the conduit by the excess fuel gas from said main plant and burning this excess fuel gas at a volume/time rate substantially smaller than the output rate to generate mechanical energy, and another electrical generator driven by the mechanical-energy output of the gas turbine in the satellite plant.

6 Claims, 1 Drawing Sheet

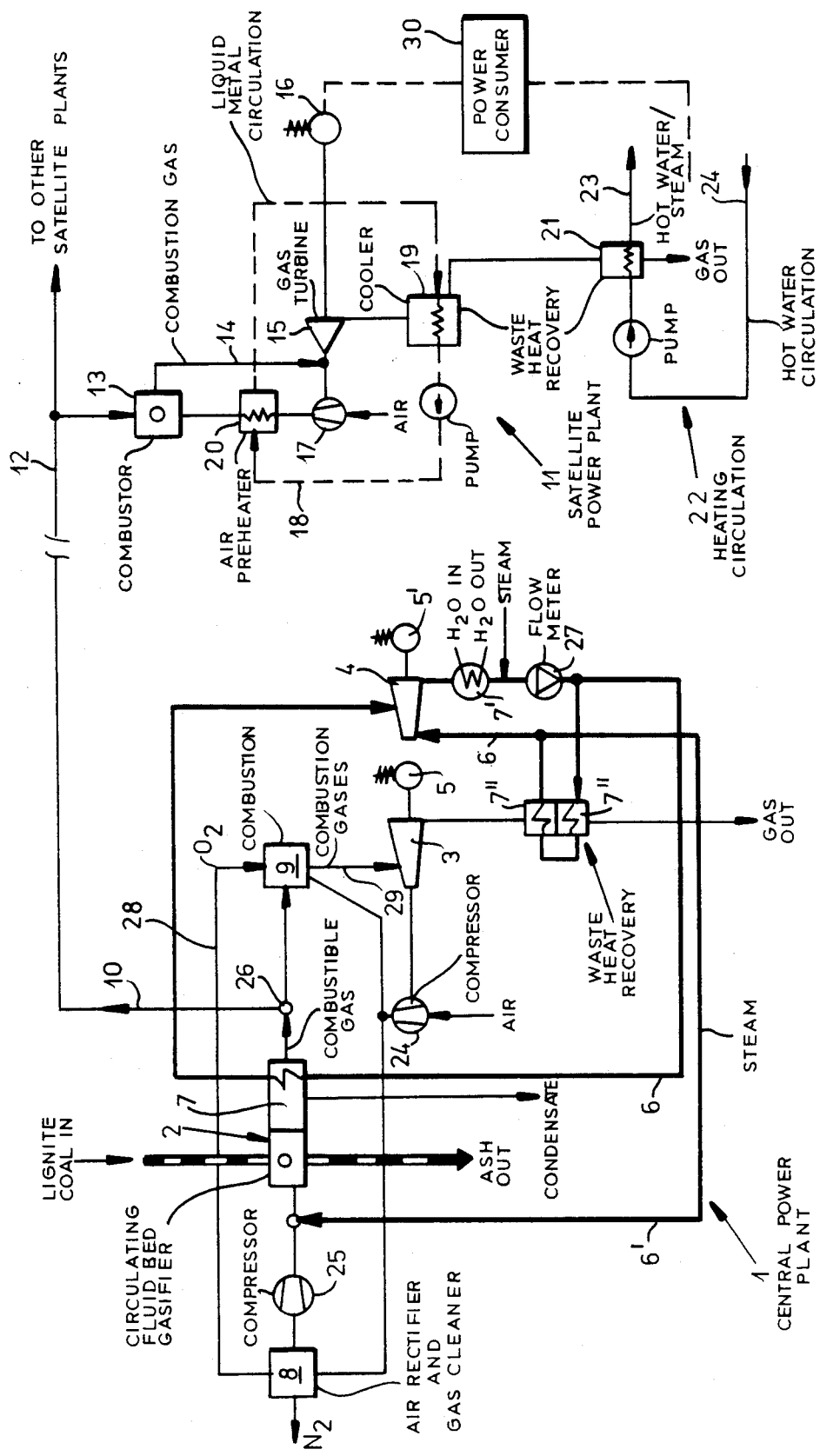

POWER PLANT INSTALLATION

CROSS REFERRENCE TO RELATED APPLICATION

This application is a continuation-in-part of my copending patent application Ser. No. 135,137 filed 18 Dec. 1987 (abandoned).

FIELD OF THE INVENTION

The present invention relates to a power plant installation. More particularly this invention concerns an installation comprising a high-capacity main power-producing plant and, remote therefrom, a smaller-capacity satellite power plant.

BACKGROUND OF THE INVENTION

Power plant installations using coal as fuel and consisting of combinations of gas turbines, steam turbines and electric generators are known. It is also known that the heat output from a gas turbine can be utilized in a steam turbine circuit which also can produce part of its steam by utilizing the sensible heat of the fuel gases produced by and in the coal gasifier. Combination power plants of the basic structure described are known in various embodiments (see, for instance, "Energiewirtschaftliche Tagesfrage,"1984, pp. 802-808). By virtue of having the main power plant and the coal gasifier located at one place, there are substantially advantages: on the one hand the sensible heat of the produced fuel gases and the gasification operation can be used in the form of high pressure steam in the steam turbine, and on the other hand the low-pressure steam and the medium-pressure steam from the steam turbine can be used for the drying and the gasification of the coal.

In the following disclosure, the term "main plant" means generally a power plant with an output of at least 300 MW, i.e. a central power plant serving a large area, although the concept applies most broadly to any large power plant with an output greater than its satellite plant or plants.

However, the overall efficiency of such power plants as well as their reliability require improvement. It is necessary when operating them to set fuel consumption according to the amount of electricity needed, so that the plant must be dimensioned to handle large peak loads at which it is highly efficient, but must normally run at a much less efficient rate.

The standard procedure for overcoming this problem as discussed in U.S. Pat. Nos. 3,873,845 and 4,085,578 of Osthaus and Kydd, respectively, is to stockpile the excess gas produced during periods of low electricity needs, and burn it when demand is higher. Such storage is a problem and still often leads to running the gasifier at a relatively low rate when its efficiency would be boosted considerably if set to burn more fuel.

OBJECTS OF THE INVENTION

It is therefore an object of the present invention to provide an improved power plant installation.

Another object is the provision of such an improved power plant which affords a very high degree of utilization of the heat available from the fuel, and which at the same time yields a large proportion of electrical energy.

A further object is to provide power plant installations having high reliability and environmental acceptability.

SUMMARY OF THE INVENTION

A high-output main power plant according to this invention comprises a coal gasifier producing a combustible fuel gas at a large volume/time output rate, at least one gas turbine fed by the fuel gas from the coal gasifier and burning same at a volume/time rate smaller than the output rate to produce heat and mechanical energy, at least one steam turbine fed by the heat generated by the gas turbine, and an electrical generator driven by the steam turbine. A conduit conducts the continuously produced excess fuel gas from the main plant to a remote user where there is at least one satellite plant itself comprising a gas turbine fueled from the conduit by the excess fuel gas from the main plant and burning this excess fuel gas at a volume/time rate substantially smaller than the output rate to generate mechanical energy, and another electrical generator driven by the mechanical-energy output of the gas turbine in the satellite plant.

Thus with this system the remote user can be a relatively clean and virtually totally automated plant that can be built downtown, even in an environmentally sensitive location, normally making no more than 30 MW of electricity. The waste gases from such a plant are easily vented, comprising little more than carbon dioxide and water vapor and carrying no particulates or offensive components at all. On the other hand the complex coal-burning main plant, which itself is producing about 300 MW of electricity, can be located near the source of coal in a location that is not as environmentally sensitive.

According to this invention the coal gasifier is a fluidized beb unit that is fueled by lignite. Such a plant can operate at upward of 80% efficiency if it can be kept going at near full capacity.

In accordance with further features of this invention the satellite plant further comprises a combustor connected between the conduit and the satellite-plant gas turbine for burning air and the excess gas so as to boost the pressure and temperature of the excess gas and for feeding the burnt gas to the satellite turbine, an air preheater for preheating air entering along with the excess fuel gas into the gas turbine, and a heat-recovery circuit including at least one exit gas heat exchanger for recovering heat from gases exiting from the gas turbine of the satellite plant gas turbine and transferring the recovered heat to a working fluid, and a loop for feeding the working fluid through the preheater.

This working fluid can be a liquid metal consisting at least partially of sodium or potassium. In addition on the exit side of the exit gas heat exchanger there is provided at least one further heat exchanger.

The excess fuel gas stream can be conducted without difficulty from the main plant to the satellite plants, for instance by gas pipelines. In this way, distances of 100 km and more can be spanned.

If in the satellite plant a good portion of the gas turbine heat output can be exchanged from the low pressure side to the high pressure side, as is done in a preferred embodiment of the invention, then degrees of efficiency can be achieved about equal to the efficiency of the prior-art combination plant. The overall efficiency of utilization of the heat of the fuel gas in the satellite plant reaches about 90%, and at the same time the electrical yield reaches 50% or higher. The satallite plants are environmentally benign, simple, and compact, and they can be situated without problems in urban areas. They operate with high reliability and with a minimum of personnel.

BRIEF DESCRIPTION OF THE DRAWING

The above and other objects, features and advantages of the present invention will become more readily apparent from the following description, reference being made to the accompanying highly diagrammatic drawing in whose sole FIGURE is a flow diagram of a plant according to the invention.

SPECIFIC DESCRIPTION

The power plant installation shown in the drawing is fueled by lignite, that is brown coal. The basic structure comprises a main power plant 1 which is operated as a combination power plant and that is normally situated in a rural or environmentally insensitive area near a source of the fuel, and a satellite power plant 11 that can be in more environmentally sensitive area, for instance in a city.

The main plant 1 consists of a circulating-type fluidized-bed coal gasifier 2 incorporating a heat exchanger 7, a gas turbine 3, a steam turbine 4 whose output passes through a heat exchanger 7' and a flow meter 27, and electric generators 5 and 5' respectively driven by the turbines 3 and 4. The heat outut of the gas turbine 3 is transferred by a double heat-exchanger 7" to a conduit loop 6 that passes through the gasifier 2 and through the turbine 4, andy excess steam going via a bypass line 6' to the coal gasifier 2 which is not shown in detail. The dashed line going into the top of the gasifier represents the coal input and the deshed line going down out of it the ash. An air rectification and purification device 8 receives air from a compressor 24 operated by the gas turbine 3 and feeds it via another compressor 25 to be gasifier 2 and directly via a line 28 to a combustor 9.

The gasifier 2 produces combustible fuel gas that is first preheated in the exchanger 7 and then fed via a valve 26 to the combustor 9 which mixes it with air from the line 28 and produces combustion gases in a line 29 that are considerably hotter and more pressurized than the incoming air and combustible gases. This line 29 is connected to the input of the turbine 3 that drives both the generator 5 and compriessor 24. The output of the turbine 3 is vented through the double heat exchanger 7".

The steam in the loop 6 receives substantial heat in the exchanger 7" and serves, in addition to adding steam to the gasifier 2 via the line 6', to drive the turbine 4 that in turn drives the generator 5'. The steam exiting from the turbine 4 passes through the heat-exchanger 7' and is replenished with more steam before entering the input of the exchanger 7".

The gasifier 2 operates to produce fuel gas at a substantially higher volume/time rate than it is possible for the combustor 9 to burn. The excess gas is shunted by the valve 26 to a line 10 in turn feeding a conduit 12 that extends many kilometers to the satellite plant 11 and , if sufficient output is available, to several such plants 11.

The satallite power plant 11 has a combustor 13 for the burning of the fuel gases and having outlet duct 14 that leads to a gas turbine 15 that drives both a compressor or pump 17 and another electrical generator 16, the latter serving a remote power consumer shown schematically at 30. The compressor 17 supplies comprissed air via a preheater 20 to the combustor 13. In addition the satellite plant 11 has a heat recovery circuit or loop 18 which passes through at least one heat exchanger 19 for the gas exiting the turbine 15 and the air preheater 20. The air preheater 20 preheats the combustion air for the excess fuel gas. The heat recovery circuit 18 has as its working heat-exchange fluid a liquid matel, for example sodium or potassium or a mixture thereof having a lower melting point.

The output of the exit gas heat exchanger 19 is connected to a further heat exchanger 21 for a heating loop 22 having an outlet pipe 23 that leads to the site of heat usage by the consumer 30 and an intake pipe 24 that returns from the site of heat usage. Since the heat thus taken out is extracted downstream of the gas turbine 15, changes in this heat demand here have no influence on the production of electricity. On account of the high efficiency and the ability to supply heat on demand, the gas turbine 15 can be operated at its nominal rating, which in turn has a favorable influence on the power availability.

Due to the high overall efficiency of fuel use in the power plant installation of the invention, primary energy savings are obtained. Moreover, since the satellite plants are being fed with a fuel gas low in harmful pollutants, environmental damage is minimized.

I claim:
1. In combination:
   a high-output main power plant comprising:
      a coal gasifier producing a combustible fuel gas at a large volume/time output rate,
      at least one gas turbine fed by the fuel gas from the coal gasifier and burning same at a volume/time rate smaller than the output rate to produce heat and mechanical energy,
      at least one steam turbine fed by the heat generated by the gas turbine, and
      an electrical generator driven by the steam turbine,
   a conduit for conducting the excess fuel gas from the main plant to a remote power consumer; and
   at least one satellite plant located near the remote power consumer and connected to the main plant by the conduit, the satallite plant comprising:
      a gas turbine fueled from the conduit by the excess fuel gas from said main plant and burning this excess fuel gas at a volume/time rate substantially smaller than the output rate to generate mechanical energy,
      another electrical generator driven by the mechanical-energy output of the gas turbine in the satallite plant,
      a combustor connected between the conduit and the satellite-plant gas turbine for burning air and the excess gas so as to boost the pressure and temperature of the excess gas and for feeding the burnt gas to the satellite turbine,
      an air pheheater for preheating air entering along with the excess fuel gas into the gas turbine, and
      a heat-recovery circuit including at least one exit-gas heat exchanger for recovering heat from gases exiting from the gas turbine of the satellite plant gas turbine and transferring the recovered heat to a wording fluid, and a loop for feeding the working fluid through the preheater.
2. The power-plant combination defined in claim 1 wherein the coal gasifier is a fluidized bed unit.
3. The power-plant combination defined in claim 2 wherein the gasifier is fueled by lignite.

4. The power-plant combination defined in claim 1 wherein the working fluid is a liquid metal consisting at least partially of sodium or potassium.

5. The power-plant combination defined in claim 1 wherein on the exit side of the exit gas heat exchanger there is provided at least one further heat exchanger.

6. The power-plant combination defined in claim 5 wherein the main plant produces electricity at a rate of at least 300 MW.

* * * * *